United States Patent
Lewis (10) Patent No.: US 11,836,254 B2
(45) Date of Patent: Dec. 5, 2023

(54) SYSTEM AND METHOD FOR SECURING A SERIES OF FIRMWARE FUNCTION CALLS USING SESSION TOKENS

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 70 days.

(21) Appl. No.: 16/130,039

(22) Filed: Sep. 13, 2018

(65) Prior Publication Data

US 2019/0080092 A1 Mar. 14, 2019

Related U.S. Application Data

(60) Provisional application No. 62/558,832, filed on Sep. 14, 2017.

(51) Int. Cl.
| | |
|---|---|
| *G06F 21/57* | (2013.01) |
| *G06F 21/60* | (2013.01) |
| *H04L 9/08* | (2006.01) |
| *G06F 9/54* | (2006.01) |
| *H04L 9/32* | (2006.01) |
| *G06F 9/4401* | (2018.01) |
| *G06F 21/44* | (2013.01) |

(52) U.S. Cl.
CPC .......... *G06F 21/572* (2013.01); *G06F 9/4411* (2013.01); *G06F 9/545* (2013.01); *G06F 21/44* (2013.01); *G06F 21/57* (2013.01); *G06F 21/606* (2013.01); *H04L 9/0869* (2013.01); *H04L 9/3213* (2013.01)

(58) Field of Classification Search
None
See application file for complete search history.

(56) References Cited

U.S. PATENT DOCUMENTS

| | | | | |
|---|---|---|---|---|
| 5,724,272 A | * | 3/1998 | Mitchell | G06F 13/105 |
| | | | | 702/123 |
| 9,477,848 B2 | | 10/2016 | Nicholes | |
| 9,660,807 B2 | | 5/2017 | Lewis | |
| 9,727,390 B1 | | 8/2017 | Righi | |
| 9,734,311 B1 | | 8/2017 | Righi et al. | |
| 2003/0226015 A1 | * | 12/2003 | Neufeld | G06F 21/305 |
| | | | | 713/166 |
| 2006/0005015 A1 | * | 1/2006 | Durham | H04L 9/3236 |
| | | | | 713/164 |
| 2007/0234058 A1 | * | 10/2007 | White | H04L 9/3247 |
| | | | | 713/176 |
| 2009/0172797 A1 | * | 7/2009 | Yao | G06F 21/604 |
| | | | | 726/9 |

(Continued)

OTHER PUBLICATIONS

Dickson, Ben "How to Prevent Replay Attacks on Your Website" [online] SitePoint. Aug. 17, 2016 [retrieved Jun. 7, 2020]. Retrieved from the Internet: URL: https://www.sitepoint.com/how-to-prevent-replay-attacks-on-your-website/ (Year: 2016).*

(Continued)

*Primary Examiner* — Linglan Edwards
*Assistant Examiner* — Joshua Raymond White
(74) *Attorney, Agent, or Firm* — McCarter & English, LLP (57) ABSTRACT

A mechanism for securing a series of related function calls for firmware services using session tokens is discussed.

17 Claims, 7 Drawing Sheets

(56) References Cited

U.S. PATENT DOCUMENTS

| | | | | |
|---|---|---|---|---|
| 2009/0249448 | A1* | 10/2009 | Choi | H04L 67/14 726/4 |
| 2013/0067229 | A1* | 3/2013 | German | H04L 63/0815 713/171 |
| 2014/0089117 | A1* | 3/2014 | Schumacher | G06Q 20/40 705/40 |
| 2014/0195576 | A1* | 7/2014 | Kaplan | G06F 7/588 708/250 |
| 2015/0235042 | A1* | 8/2015 | Salehpour | G06F 21/44 726/4 |

OTHER PUBLICATIONS

Dickson, Ben "How to Prevent Replay Attacks on Your Website" [online] SitePoint. Aug. 17, 2016 [retrieved Feb. 16, 2021]. Retrieved from the Internet: URL: https://www.sitepoint.com/how-to-prevent-replay-attacks-on-your-website/ (Year: 2016).*

Defuse Security "Salted Password Hashing—Doing it Right" [online] Crackstation.net via Archive.org. Aug. 1, 2017 [retrieved Feb. 16, 2021]. Retrieved from the internet: https://web.archive.org/web/20170913190307/https://crackstation.net/hashing-security.htm (Year: 2017).*

UEFI, Unified Extensible Firmware Interface Specification, Version 2.2D. 2082 pages, Nov. 2, 2010.

* cited by examiner

SYSTEM AND METHOD FOR SECURING A SERIES OF FIRMWARE FUNCTION CALLS USING SESSION TOKENS

RELATED APPLICATION

This application claims the benefit of, and priority to, U.S. Provisional Patent Application No. 62/558,832, filed Sep. 14, 2017, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

The computing device contains one or more elements known as Central Processing Units (CPUs) which, when in operation, can read from and also erase and/or write flash ROM. The CPU has a normal operating mode and a second operating mode called System Management Mode (SMM). When the CPU is in normal operating mode it can access all elements of the computer except certain memory regions exclusively dedicated to SMM mode. In contrast, when the CPU is operating in SMM mode it is able to access all elements of the computing device including the dedicated memory. An electrical signal is made available within the circuitry of the computing device which can indicate when the CPU is operating within SMM. The CPU device may be directed to transition from normal operating mode to SMM by a number of triggers called System Manage Interrupt (SMI) events including SMI events triggered by firmware. The exact triggers available differ somewhat from among system designs but the result when the platform appropriate trigger is used is always that execution in main memory is immediately suspended and execution begins at a specific location in SMM memory.

BRIEF SUMMARY

Embodiments of the present invention provide a system and method for reducing the chance of man-in-the-middle attacks against a series of related function calls by an operating system-based calling entity to firmware services. More particularly in embodiments a single function call is made initially with authentication information. Following authentication, a session and privilege level are established for the operating system-based calling entity. A session token, preferably randomized, is returned to the calling entity by the firmware to be included in a function call for firmware services. The session token and privilege level are verified prior to performing the requested service. Each return from a firmware service includes an updated and preferably randomized session token to be used by the calling entity in any subsequent function call for firmware services during the session. Additional embodiments provide protection for software SMIs and other software-invoked transitions from an OS environment to a secure environment.

In one embodiment, a method for authenticating related firmware service calls in a computing device includes receiving a request with the firmware to open a session from an operating system-based calling entity, the request accompanied by authentication data. The method further includes authenticating the operating system-based calling entity based on the authentication data and establishing a session between the operating system-based calling entity and the firmware, the session including a privilege level for firmware service requests made in the session that is based on the authenticating of the operating system-based calling entity. The firmware returns a session token to the operating system-based calling entity. The method additionally includes receiving with the firmware a firmware service call from the calling entity accompanied by the session token as a calling parameter, verifying the session token and that the privilege level is adequate for the firmware service call, and performing the firmware service call with the firmware based on the verifying of the session token and the privilege level. The method further includes returning an updated session token with a firmware service call return to the operating system-based calling entity after the performing of the firmware service call and receiving a subsequent related firmware service call accompanied by the updated session token as a calling parameter. The method verifies the updated session token and that the privilege level is adequate for the subsequent related firmware service call and performs the subsequent related firmware service call with the firmware based on the verifying of the updated session token and the privilege level.

In another embodiment, a computing device configured to securely handle related function calls to firmware includes at least one processor, an operating system and firmware. The firmware when executed receives a request to open a session from an operating system-based calling entity, the request accompanied by authentication data. The firmware authenticates the operating system-based calling entity based on the authentication data and establishes a session between the operating system-based calling entity and the firmware. The session includes a privilege level for firmware service requests made in the session that is based on the authenticating of the operating system-based calling entity. A session token is returned to the operating system-based calling entity. The firmware when executed further receives a firmware service call from the operating system-based calling entity accompanied by the session token as a calling parameter, verifies the session token and the privilege level, and performs the firmware service call based on the verifying of the session token and the adequacy of the privilege level for the requested service. Additionally the firmware when executed returns an updated session token with a firmware service call return to the operating system-based calling entity after the performing of the firmware service call, receives a subsequent related firmware service call accompanied by the updated session token as a calling parameter, verifies the updated session token and that the privilege level supports the subsequent related firmware service call, and performs the subsequent related firmware service call based on the verifying of the updated session token and the privilege level.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

When OS applications or OS drivers make calls to services provided by the platform firmware (such as UEFI BIOS), there is often some requirement that the caller prove that they have the necessary privileges to perform sensitive operations. An example might be changing platform settings (such as password or boot order) or changing the platform configuration (such as changing a protection level or enabling/disabling devices). In order to prove that they have the necessary privileges, the caller of the firmware service must provide some form of authentication data to prove identity. This authentication data can take the form of the platform's BIOS password. Alternatively the authentication data may be in the form of a signature signed by a private key for which the BIOS has the corresponding public key. Similarly, the authentication data may be biometric information for the user of the computing device, or the possession of a paired token device (such as a smart card, USB key with a certificate file or paired BlueTooth device). It will be appreciated that the authentication data may also take additional forms not specifically listed above.

When only a single call or a few calls are required to the firmware services, it is not a significant problem for the operating system-based caller to go through the authentication process (whereby the caller provides the necessary authentication data as proof of having privileges) each time. But when an action requires many calls to be made, it can be cumbersome to repeat the authentication process each time. In these cases, it is useful to open a session (usually with a service call) in which authentication is obtained for a type of service. Then zero or more operations are carried out using the privileges granted by that authentication. Then, the session is closed, because it is implicit in the sequence of operations, because a close-session service call is made, a time limit has expired or because of a platform reset or other unexpected caller termination.

Figure 1:
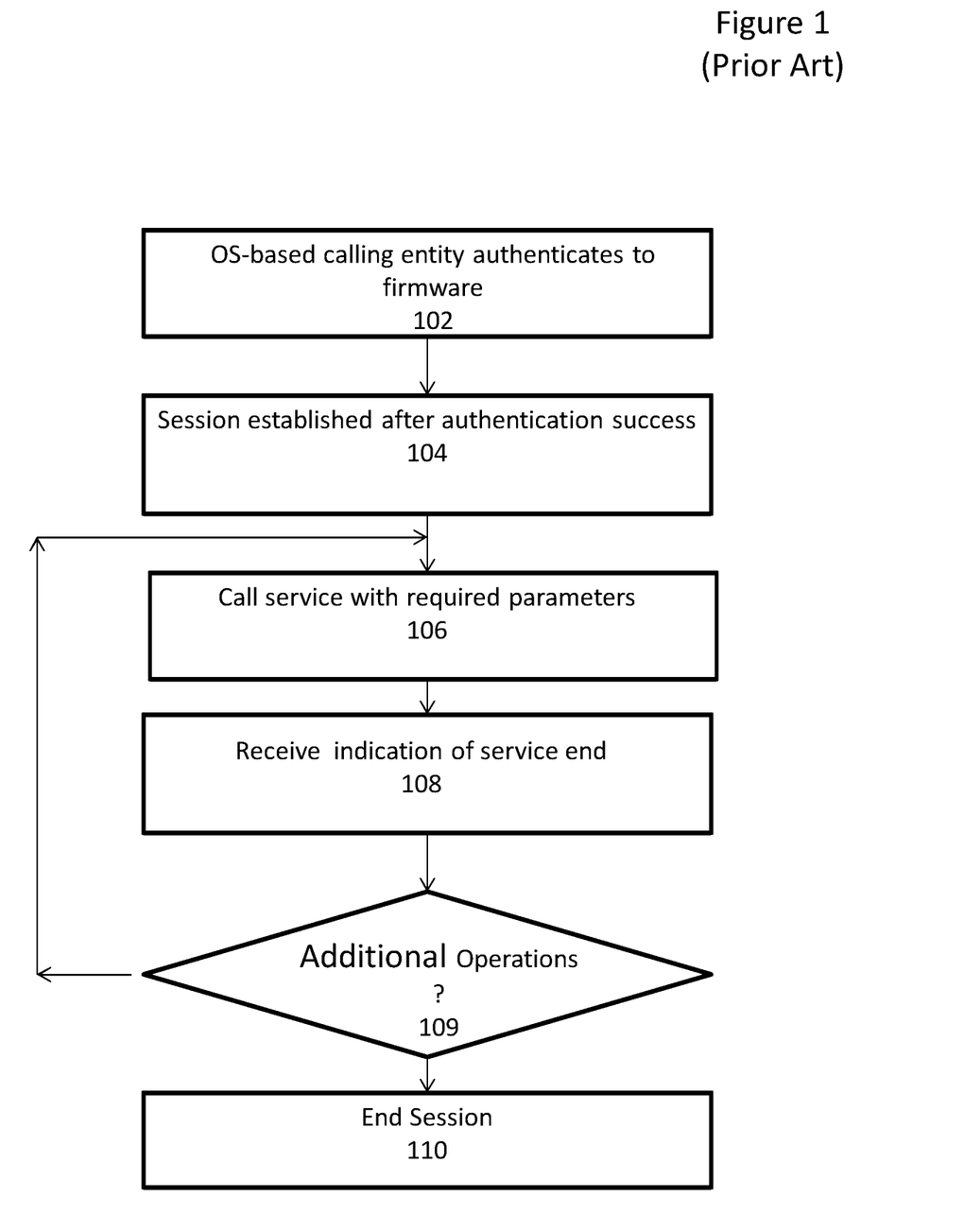
FIG. 1 (prior art) depicts a conventional sequence of steps in a computing device to establish a session between an operating system entity and platform firmware and to make a series of function calls for firmware services relying on an initial authentication.

FIG. 1 (prior art) depicts this conventional sequence of steps in a computing device to establish a session and make a series of firmware function calls. The sequence begins with an OS-based calling entity such as an application or OS driver that wants to make a call to execute a firmware service authenticating itself to the firmware (step 102). After the caller is successfully authenticated a session is established between the firmware and the OS-based calling entity (step 104). The OS-based calling entity then calls the firmware service including any required parameters along with the call (step 106). After executing the service, the firmware provides an indication and/or the results of the service to the caller (step 108). If there are more operations desired by the caller (step 109), the sequence iterates and the previously authorized caller requests another service without authenticating again using the established session (steps 106 and 108). Once the firmware services have all been completed, the session ends (step 110).

Unfortunately the conventional sequence outlined in FIG. 1 presents a number of security concerns including the possibility of "man-in-the-middle" forms of attacks. For example, one problem with the type of conventional approach to requesting firmware services described above is that if a rogue agent/malicious entity running in parallel can gain access to the session it can make a call after the session is opened and before it is closed and it will have the same level of privilege as the authorized caller. That is, the firmware will be unable to distinguish this rogue agent from an authorized agent. This case can happen, for example, when the service calls are handled using atomic software SMI calls or UEFI firmware services (e.g.: SetVariable, UpdateCapsule). The malicious entity can call them as readily as the authorized caller. These security shortcomings are visually illustrated in FIGS. 2A-2C.

Figure 2A:
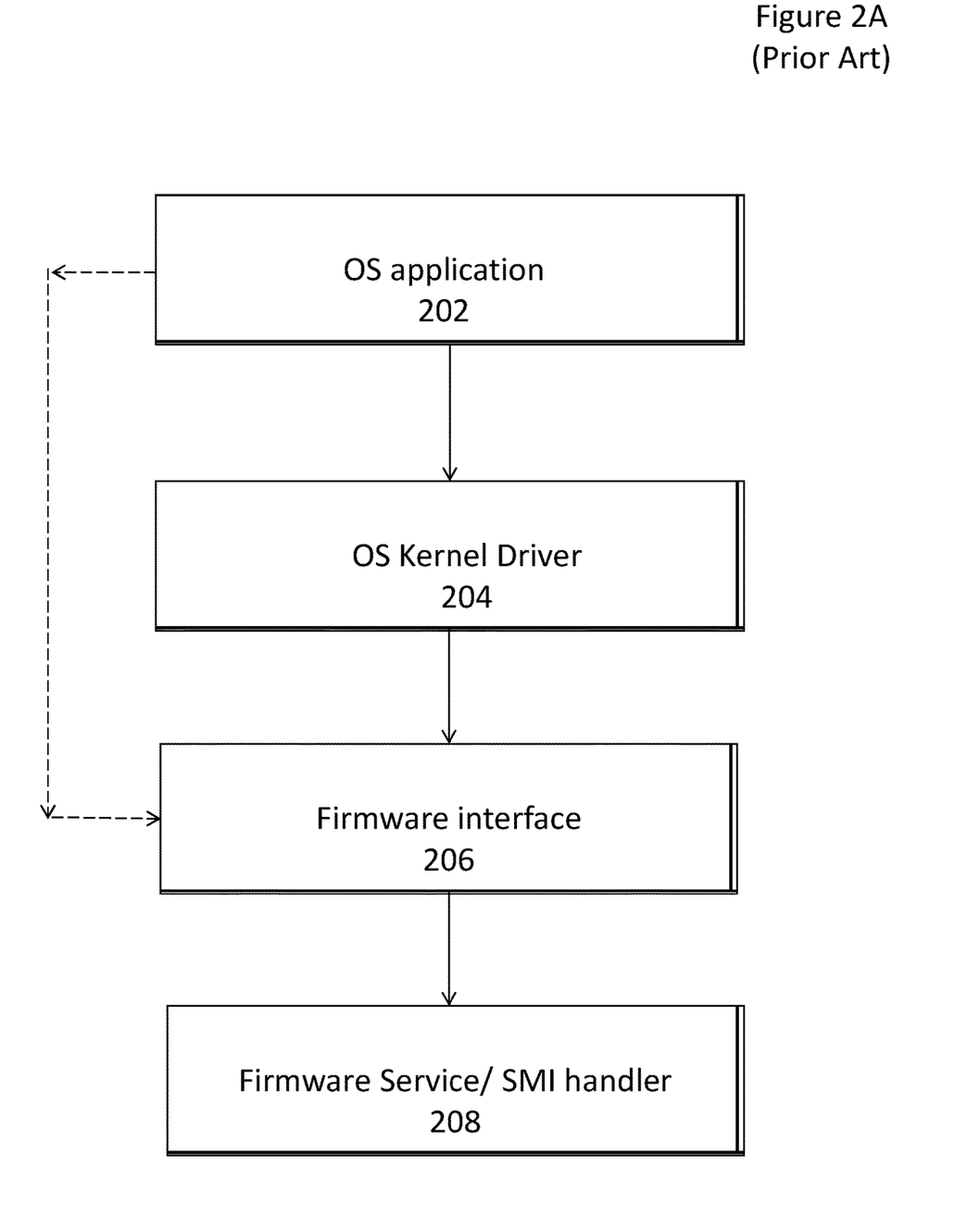
FIG. 2A (prior art) depicts an exemplary interaction between an OS-based application using an OS kernel driver to make a series of firmware function calls via a firmware interface in a conventional system.

FIG. 2A (prior art) depicts an intended exemplary interaction between an OS-based calling entity and the platform firmware to conventionally make a series of related firmware function calls via an SMM interface. More particularly, an OS-based calling entity executing in the operating system environment such as an application 202 or OS-kernel driver 204 of sufficient privilege (operating at the direction of the application) may make a firmware service call. The firmware service call may generate a software SMI which triggers an invocation of SMM to handle the call or may otherwise be made using an available firmware interface 206. The firmware interface 206 receives the firmware service call and related authentication data. Following a successful authentication of the caller, a session is established and firmware service/SMI handler code 208 assigned to handle the requested service is executed. Subsequent related requests by the caller utilize the same session without re-authenticating the caller. As noted above, this conventional approach omits re-authentication for each call but has security shortcomings such as those outlined in FIGS. 2B and 2C.

Figure 2B:
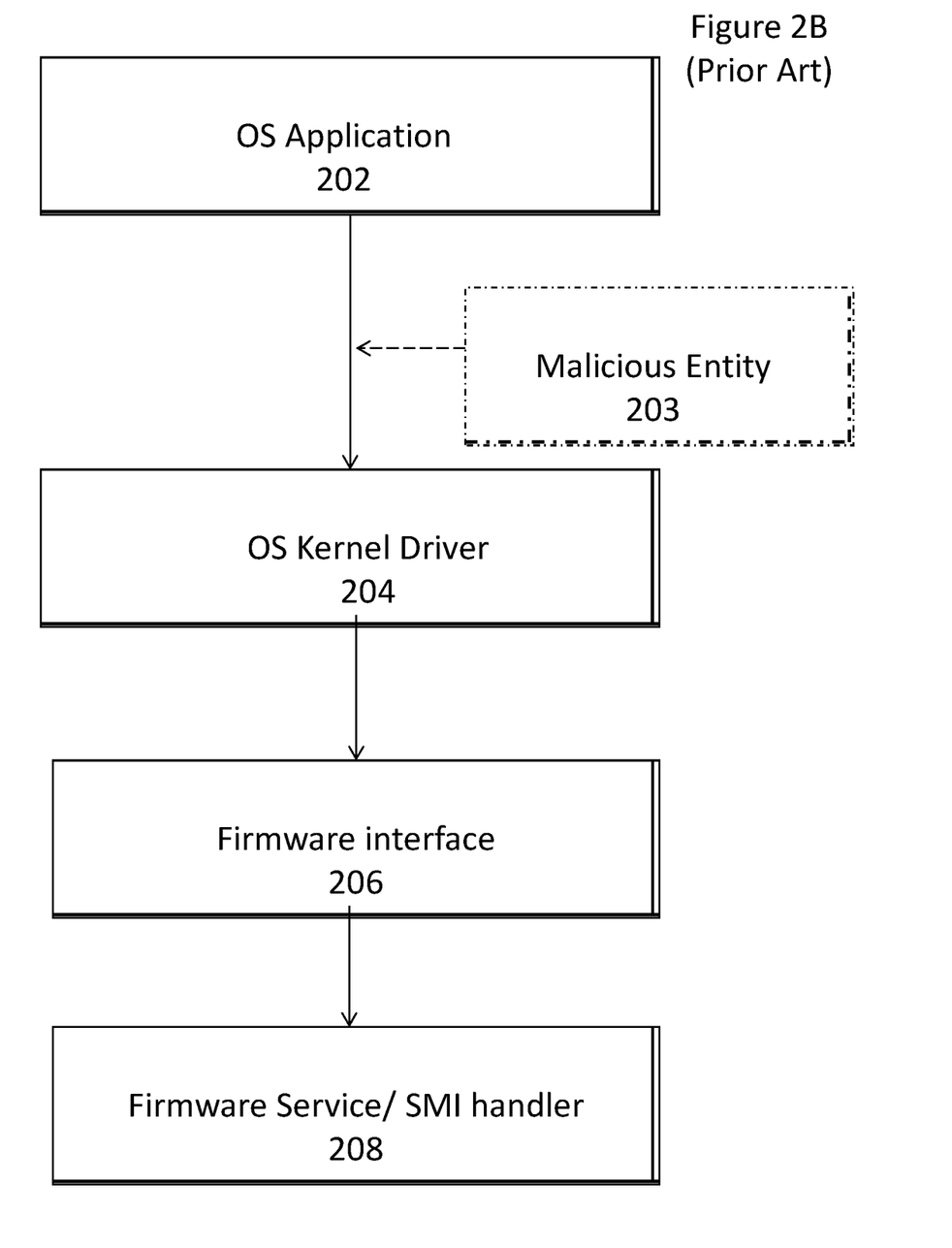
FIG. 2B (prior art) depicts a representation of a malicious entity pretending to be an OS-based application that opened a session that uses an OS kernel driver to make a series of firmware function calls via a firmware interface in a conventional system.

FIG. 2B (prior art) depicts an exemplary representation of a malicious entity pretending to be an OS-based application that opened a session and uses an OS kernel driver to make a series of firmware function calls via an SMM or other firmware interface. In this scenario, the session has already been established and the malicious entity 203 pretends to be the application 202 and controls the OS-kernel driver 204 to issue firmware service commands using the open session. It should be appreciated that in some circumstances the application may make the firmware service call itself directly without the use of the OS kernel driver and in those circumstances a malicious entity could interact directly with the firmware interface when sending commands. Since there is no additional caller authorization or other form of verification, the firmware executes the commands issued by the malicious entity.

Figure 2C:
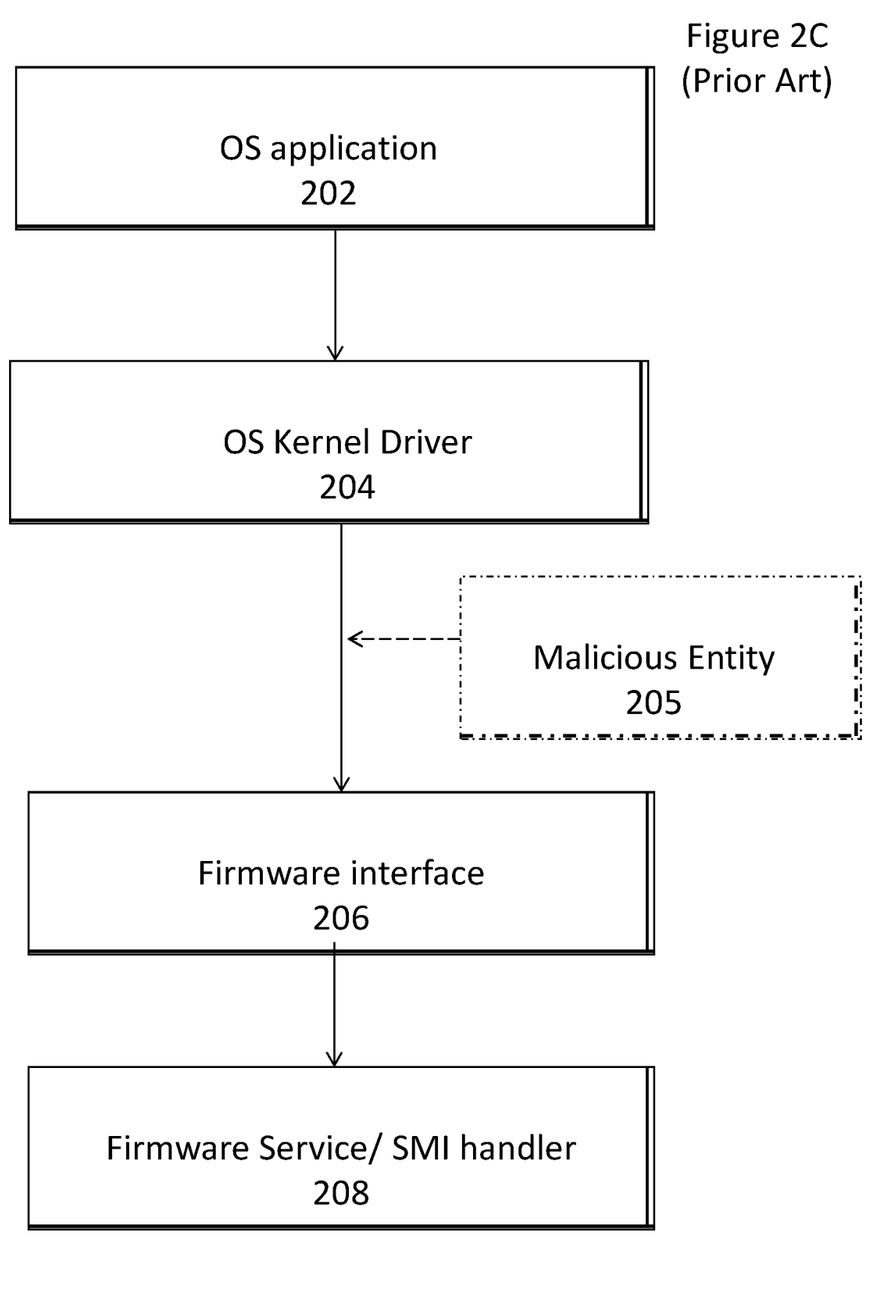
FIG. 2C (prior art) depicts a representation of a malicious entity pretending to be an OS kernel driver to make a series of firmware function calls via a firmware interface in an established session in a conventional system.

Alternatively, FIG. 2C (prior art) depicts an exemplary representation of a malicious entity 205 pretending to be the OS kernel driver 204 to make a series of firmware function calls via an SMM interface in an established session. Similarly to the situation where the malicious entity impersonated the calling application, since there is no additional caller authorization or other form of verification, the firmware executes the commands issued by the malicious entity pretending to be the OS kernel driver.

A number of different approaches have been attempted to address these man-in the-middle attack type of issues. In one approach the UEFI variable services provide authentication using private and public keys. The BIOS is provisioned with several public keys that can be used to authenticate the data passed to these functions that has been signed by a private key. However, this approach is limited as it requires that the caller have access to a private key. While this is feasible for distributing updates from a trusted source (the OS vendor, the platform vendor, etc.), most OS vendors or OEMs will not give out their private key since it is the crypto secret. As a result, most applications cannot make arbitrary service calls using this form of authentication since it would require that the application have the private key and that would be a security risk.

Additional attempts have been made to provide authentication for UEFI variables using the system password and then attempting to authenticate firmware service calls via a password. However, this requires that the password be passed with each service call or else the technique runs into the problem described above.

To address these issues, embodiments as discussed herein help to prevent such actions by malicious actors by requiring each new firmware service call in an established session to have an updated session token that is returned by the firmware to the calling entity after the performance of the previous firmware service call. Any subsequent function call to firmware services in the session requires the inclusion of the updated session token as a parameter and its verification. Since the malicious entity will lack such an updated session token since it wasn't part of the previous call (and therefore didn't receive the updated session token upon its completion) it will not be able to request a firmware service that will be executed by the firmware. Through this technique, embodiments protect against man-in-the-middle attacks such as those mentioned above.

In one embodiment, during an authentication service call to initially establish a session between an OS-based calling entity, such as but not limited to an OS environment-based application or OS-kernel driver, after the authentication proof information is validated, the call will return with a random session token. In a preferred embodiment an actual random number is used for the session token rather than a pseudo-random number, since pseudo-random numbers can be predicted if the algorithm is known. In one embodiment, the random number serving as the session token is provided by a CPU instruction in the x86 instruction set. Other types of session tokens (such as random strings of characters) and other random number sources could also be used within the scope of the present invention. Further, although not preferred, the use of pseudo-random numbers or other approaches using updated though non-random session tokens, such as, but not limited to, incrementing a session token, should also be considered to be within the scope of the present invention. It should be noted that while the use of a pseudo-random session token provides more security than other approaches that use non-random session tokens (such as incrementing the session token) due to the fact that pseudo-random generators meet the even distribution curve requirement thereby making them hard to guess using brute force, they are still predictable and so their use is less optimal than using truly random session tokens. After the authentication service call, the session token must be presented as one of the calling parameters to any firmware service call that needs privileges. Upon exit from this privileged service call, a new, random, session token is returned by the firmware to the OS-based calling entity. This updated session token must then be used for the next call to firmware services of similar privilege in the established session. If the incorrect session token is presented as a parameter to a firmware service call, then the session is closed. When the session is closed, the session must be opened again before using any of the privileged service calls.

Embodiments thus do not require authentication with each individual call to firmware services in order to maintain security but still enable an established session to safely be used for related firmware service calls through the use of updated session tokens for each new call. The original authentication information is protected by presenting it only once. For example, a password used as authentication information is only present briefly, during the initial service call. Embodiments thus speed up firmware service calls, since the cryptographic authentication is only needed once, not for each call. Additionally embodiments simplify the code needed to process the firmware service calls because they allow the authentication code portion to be completely removed from the code path for handling the firmware service. Only the session token/updated session token and privilege level must be verified for each request in the session.

Embodiments therefore make it difficult for a rogue agent/malicious entity to make an unauthorized service call, because malicious entities must either guess the random number used as the session token or they must find and copy the current session token from the authorized caller's memory space. The operating system includes some protections of the memory space. Further, in one embodiment, CPU registers may be used to store the session token/ updated session token upon receipt from the firmware therefore making it harder to read the session token contents through an external hardware analyzer. The CPU register must be transferred to memory at some point in most implementations, but the memory it is stored in may also be controlled. For example, in one embodiment, the session token contents may be stored in a kernel driver's private data, rather than in a shared communication buffer. In another embodiment, the session token contents can be stored in a secure storage device, such as but not limited to, a Trusted Platform Module (TPM). If a rogue agent/malicious entity does somehow manage to get the current session token and use it to make an illegitimate call for a firmware service, then the authorized calling entity's next call will fail, which may trigger a security log event and the session being closed.

Figure 3:
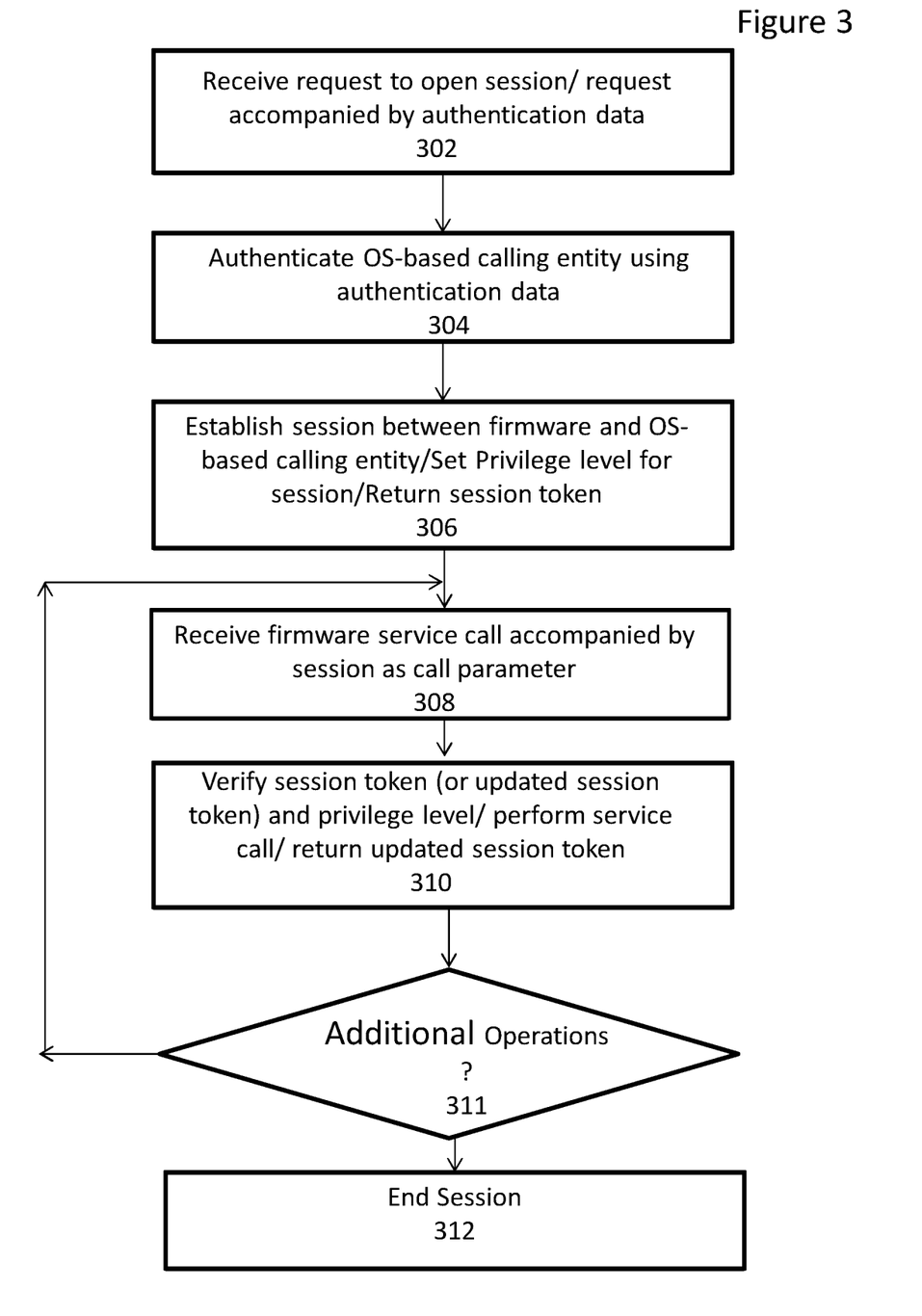
FIG. 3 depicts an exemplary sequence of steps to establish a session and make a series of related firmware function calls for firmware services using updated session tokens for each call in an exemplary embodiment.

FIG. 3 depicts an exemplary sequence of steps followed by an embodiment to establish a session between an OS-based calling entity and platform firmware that enables the OS-based calling entity to make a series of related function calls for firmware services using an updated session token for each call. The sequence begins with the firmware receiving the request to open a session from an OS-based calling entity such as an application or OS kernel driver via a firmware interface (step 302). In one embodiment, the firmware interface may be an SMM interface. For example, the session may be opened using an authentication service call that includes the type of authentication requested, any necessary authentication data (and optionally, any specific privileges requested). The firmware authenticates the OS-based calling entity using the authentication data (step 304). For example, as discussed above, the authentication data may take many forms including without limitation, the platform's BIOS password, a signature signed by a private key for which the BIOS has the corresponding public key, biometric information for the user of the computing device, or the possession of a paired token device. In one embodiment, following authentication of the OS-based calling entity a privilege level for the session being opened is set for the session by the firmware based on pre-determined privilege level associated with the caller identity/type of caller, the session is opened and a session token, preferably randomized, is returned to the OS-based calling entity (step 306). The privilege level controls which firmware services can be requested in the session and any requested service in the session is verified against the privilege level to make sure the privilege level is adequate for the request (i.e. does the caller have sufficient authorization to request that service).

In one embodiment, upon receiving the request, the firmware may check to make sure that a limit of sessions is not exceeded. If a limit of sessions is reached, then an error may be returned in response to the request to open up the new session. In one embodiment, only 1 session at a time may be open. In another embodiment, multiple sessions may be open in parallel using different session tokens. If the authentication type used is inadequate for the privileges requested or the authentication data is not correct, an error may be returned. Similarly, if the authentication type is not supported, an error may be returned.

In one embodiment, the establishing of the session between the firmware and the OS-based calling entity may result in the SMM or other firmware interface being "locked" by the firmware against opening further sessions while the established session remains open. In one embodiment, the session token returned to the OS-based calling entity may indicate this locked status and must be verified by the firmware during a subsequent request from the OS-based calling entity before a firmware service may be performed.

Once the session has been established, a request for a first firmware service by the OS-based calling entity is then received by the firmware. The request includes the session token as a calling parameter and any other necessary parameters (step 308). Once the session token is verified, and the firmware verifies that the session privilege level is adequate for the requested service, the requested service is performed by the relevant firmware code tasked with handling the type of request and an updated, preferably random, session token is returned to the OS-based calling entity (step 310). If the session token is invalid or the session indicated by the session token is not open, or the session does not have the privileges required for the requested service, or a security timeout has occurred, the session may be closed and an error returned. Similarly, if the operation has failed, an error may be returned. If there are additional firmware services to be called in the session (step 311), the sequence iterates with the authorized OS-based calling entity using the returned updated session token received from the firmware in the related subsequent firmware service call. That updated session token is verified along with the adequacy of the privilege level for the subsequent service call before the subsequent service is performed. This sequence continues until the operation is complete or a fatal error has occurred (step 312). For some operations, the session will automatically be closed. Alternatively, the session may be closed using a session close service that returns a session token equal to the initialization value originally used to open the session.

In one embodiment the flow for the request by the OS-based calling entity to open the session handled by the firmware may be represented as follows:

1) If no more sessions are possible, return an error. In one embodiment, only a single session is allowed open at a given time.
2) Verify that the session token is the standard session token value.
3) If the authentication type is not supported, then return an error. This can occur when, for example, the service call must happen during specific parts of the boot process (i.e. before an end of Drive Execution Environment (DXE), before any 3$^{rd}$ party code is run, etc.) or when a specific condition exists (jumper set, in manufacturing mode, etc.) and the requirement cannot be satisfied.

4) If the authentication data is not valid, then return an error. This can occur when a password or other authentication data is not valid, or the device specified doesn't exist or doesn't have the key.

5) If the privileges requested are not available, based on the authentication type or data, return an error. In one exemplary embodiment, there only two privilege levels: minimum or full.

6) Generate a random session token. This token must not be generated using a pseudo-random number generator.

7) Record the random session token and any associated privileges data.

8) Return the random session token and return success.

1) In one embodiment the flow for the session close function may be represented as follows:

2) If there is no session open, return an error.

3) If the session token is invalid, set the status to an error. Otherwise the status is success.

4) Mark the current session as closed and remove any records.

5) Set the session token to the standard session token value.

6) Return the session token and the status.

In an embodiment, the flow for any other operation other than opening and closing a session may be represented as follows:

1) If the session token value is invalid for an open session, return the standard security token and a security error.

2) If the privileges associated with the session token value are inadequate, return the standard security token and a security error.

3) If not, 1) or 2) above, perform the operation and record the operation's status.

4) Generate a random session token and update the session's session token value.

5) Return the session token and the status.

In one embodiment, software SMIs are used as the means of making a service call for firmware services. The SMI is received by the SMM interface and the corresponding firmware SMI handler code is executed to perform the requested service. In other embodiments, the call for firmware services from the OS-based calling entity may not rely on an SMI. For example, in one embodiment, a specified type of authentication may be provided by an extension to SetVariable via a specified GUID and a session token value. The session token may also be included in the SetVariable data. Similarly, in another embodiment, an UpdateCapsule call may be used with an extended capsule header or capsule data. It should further be appreciated that additional mechanisms for the OS-based calling entity to request firmware services other than those specifically discussed herein that result in updated session tokens being utilized for each new firmware service call in the session are also within the scope of the present invention.

In an embodiment, the function number is placed in the AX register and the session token in the EBX/RBX register. The session token and function number may also be located in different registers, placed in an in-memory buffer, or stored in MMIO scratch pad registers. On other types of non-x86 architecture CPUs, the registers may be CPU registers for that architecture.

In one embodiment, there are five types of authorizations for an OS-based calling entity and each of the privileges is attached to one or more of these levels of authorization. In a first type of authorization, NULL, a session can be opened at any time. In a second type of authorization, POST-Only, a session can be opened before Ready-To-Boot. In a third type of session, DXE-Only, a session can be opened before End-Of-DXE. In a fourth type of session, Secure Environment, a session can be opened only when OEM hook says the machine's environment is physically secure. In a fifth type of session, password, a session can be opened when a BIOS password is enrolled and an application provides the user's password. In another embodiment, there may be different levels of authorization and privileges other than the five mentioned above. In one embodiment, the desired privileges may be specified separately from the type of authorization. That is, the authorization data and the privileges may be specified and the session only opened if the authorization supports the privilege desired.

Figure 4:
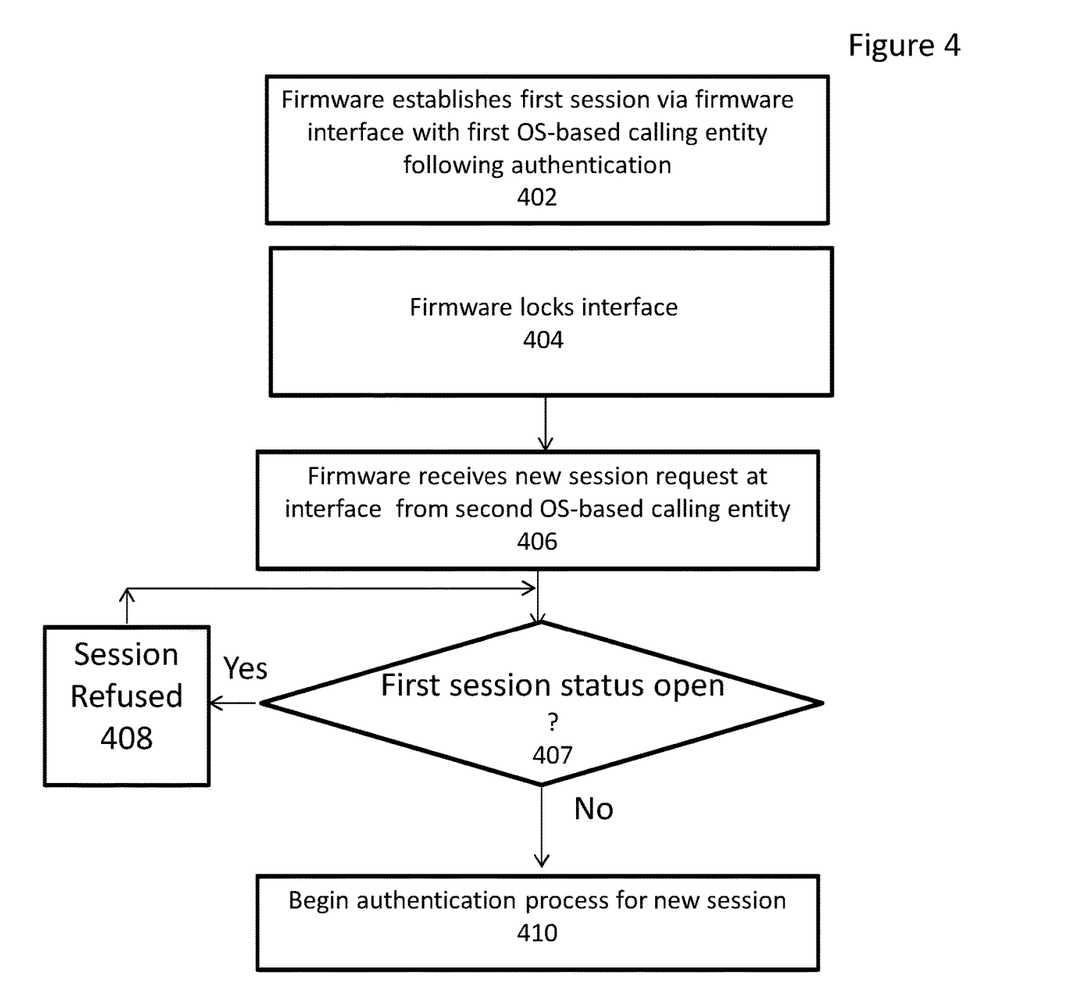
FIG. 4 depicts an exemplary sequence of steps to establish a session and lock a firmware interface in an exemplary embodiment.

FIG. 4 depicts an exemplary sequence of steps to establish a session and lock a firmware interface in an exemplary embodiment. The sequence begins with a first session being opened between a first OS-based calling entity and the platform firmware via a firmware interface such as an SMM interface (step 402). Following the establishment of the session the firmware locks the interface so that no additional sessions will be opened while the first session is active (step 404). Subsequently when the firmware receives a request from a second OS-based calling entity to open a new session at the interface (step 406), the firmware examines the status of the first session (step 407) and if the status is open refuses the request to open the new session (step 408). Alternatively, if the firmware determines that the status of the first session is closed (step 407), the firmware begins the authentication process for a second session (step 410).

Figure 5:
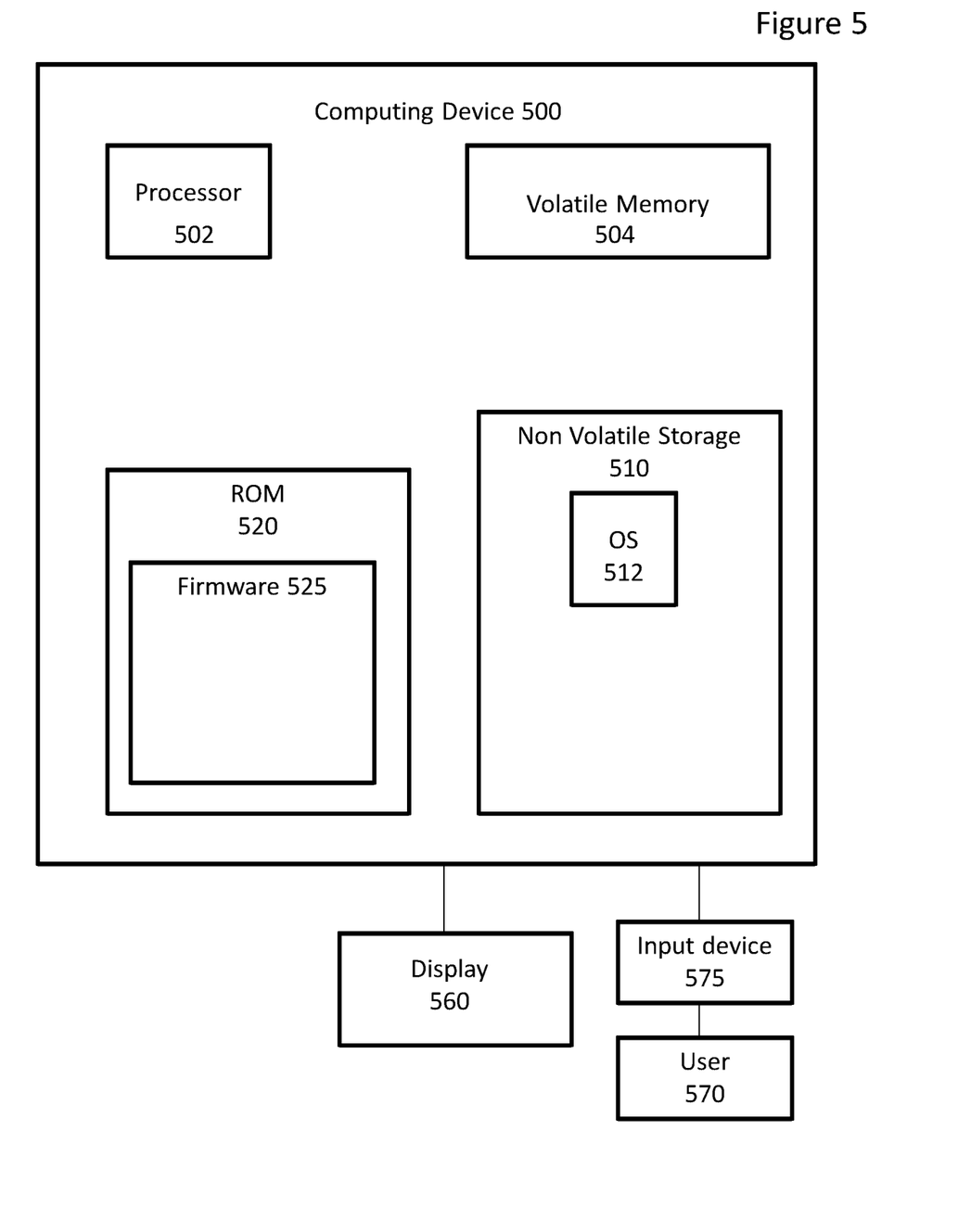
FIG. 5 depicts an exemplary computing device suitable for practicing an embodiment of the present invention.

FIG. 5 depicts an exemplary computing device suitable for practicing an embodiment of the present invention. A computing device 500 includes a processor 502 such as, but not limited to a central processing unit (CPU), and volatile memory such as random access memory (RAM) 504. The computing device 500 may also include non-volatile storage 510 such as a hard drive holding an operating system (OS) 512. The computing device 500 may also include Read Only Memory (ROM) 520 holding device firmware 525. Firmware 525 may be executed during a boot sequence for the computing device 500 (as well as at other times) and may load OS 512 into volatile memory 504 for execution. A user 570 may utilize an input device 575 such as a keyboard or touch screen to interact with computing device 500. Display 560 may be integrated into computing device 500 or may be a separate display surface.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A non-transitory medium holding computer-executable instructions for authenticating related firmware service calls in a computing device that includes firmware and at least one processor, the firmware when executed causing the computing device to:
   receive a request with the firmware to open a session from an operating system-based calling entity, the request accompanied by authentication data;
   authenticate the operating system-based calling entity based on the authentication data;
   establish the session between the operating system-based calling entity and the firmware, the session including a privilege level for multiple firmware service requests made in the session that is associated with a specified portion of a boot sequence or a physical security condition of the computing device, a session token returned to the operating system-based calling entity, the firmware rejecting any additional session requests after establishing the session until the established session is closed;
   receive a firmware service call from the operating system-based calling entity accompanied by the session token as a calling parameter;
   verify the session token and that the privilege level is adequate for the firmware service call;
   perform the firmware service call based on the verifying;
   return an updated session token with a firmware service call return to the operating system-based calling entity after the performing of the firmware service call, the updated session token based on a randomly generated number that is not a pseudo random number;
   receive a subsequent related firmware service call accompanied by the updated session token as a calling parameter;
   verify the updated session token and that the privilege level is adequate for the subsequent related firmware service call; and
   perform the subsequent related firmware service call based on the verifying of the updated session token and the privilege level.

2. The medium of claim 1, wherein the calling entity is an operating system (OS) application or OS driver.

3. The medium of claim 1, wherein the firmware receives the firmware service call and subsequent related firmware service call via a System Management Mode (SMM) interface.

4. The medium of claim 3, wherein the firmware when executed further:
   locks the SMM interface by rejecting additional session requests after establishing the session, the locking continuing until the established session is closed.

5. The medium of claim 1, wherein the randomly generated number is provided by a CPU instruction in an x86 instruction set.

6. The medium of claim 1, wherein a software System Manage Interrupt (SMI) is used to make at least one of the firmware service call or subsequent firmware service call.

7. The medium of claim 1, wherein at least one of the session token or updated session token are stored in a CPU register.

8. A method for authenticating firmware service calls in a computing device equipped with at least one processor, comprising:
   receiving a request with the firmware to open a session from an operating system-based calling entity, the request accompanied by authentication data;
   authenticating with the firmware the operating system-based calling entity based on the authentication data;
      establishing the session between the operating system-based calling entity and firmware executing on the computing device, the session including a privilege level for multiple firmware service requests made in the session that is associated with a specified portion of a boot sequence or a physical security condition of the computing device, a session token returned to the operating system-based calling entity, the firmware rejecting any additional session requests after establishing the session until the established session is closed;
   receiving with the firmware a firmware service call from the calling entity accompanied by the session token as a calling parameter;
   verifying the session token and that the privilege level is adequate for the firmware service call;
   performing the firmware service call with the firmware based on the verifying;
   returning an updated session token with a firmware service call return to the operating system-based calling entity after the performing of the firmware service call, the updated session token based on a randomly generated number that is not a pseudo random number;
   receiving a subsequent related firmware service call accompanied by the updated session token as a calling parameter;
   verifying the updated session token and that the privilege level is adequate for the subsequent related firmware service call; and
   performing the subsequent related firmware service call with the firmware based on the verifying of the updated session token and the privilege level.

9. The method of claim 8, wherein the operating system-based calling entity is an operating system (OS) application or OS driver.

10. The method of claim 8, wherein the firmware receives the firmware service call and subsequent related firmware service call via a System Management Mode (SMM) interface.

11. The method of claim 10, further comprising:
    locking the SMM interface with the firmware by rejecting additional session requests after establishing the session, the locking continuing until the established session is closed.

12. The method of claim 8, wherein the randomly generated number is provided by a CPU instruction in an x86 instruction set.

13. The method of claim 8, wherein a software System Manage Interrupt (SMI) is used to make at least one of the firmware service call or subsequent firmware service call.

14. The method of claim 8, wherein at least one of the session token or updated session token are stored in a CPU register.

15. A computing device configured to securely handle related function calls to firmware, the computing device comprising:
- at least one processor;
- an operating system; and
- firmware, the firmware when executed:
  - receiving a request to open a session from an operating system-based calling entity, the request accompanied by authentication data,
  - authenticating the operating system-based calling entity based on the authentication data,
  - establishing the session between the operating system-based calling entity and the firmware, the session including a privilege level for multiple firmware service requests made in the session that is associated with a specified portion of a boot sequence or a physical security condition of the computing device, a session token returned to the operating system-based calling entity, the firmware rejecting any additional session requests after establishing the session until the established session is closed,
  - receiving a firmware service call from the operating system-based calling entity accompanied by the session token as a calling parameter,
  - verifying the session token and that the privilege level is adequate for the firmware service call,
  - performing the firmware service call based on the verifying,
  - returning an updated session token with a firmware service call return to the operating system-based calling entity after the performing of the firmware service call, the updated session token based on a randomly generated number that is not a pseudo random number,
  - receiving a subsequent related firmware service call accompanied by the updated session token as a calling parameter,
  - verifying the updated session token and that the privilege level is adequate for the subsequent related firmware service call, and
  - performing the subsequent related firmware service call based on the verifying of the updated session token and the privilege level.

16. The computing device of claim 15, wherein the operating system-based calling entity is an operating system (OS) application or OS driver.

17. The computing device of claim 15, wherein at least one of the session token or updated session token are stored in a CPU register.

* * * * *